(12) United States Patent
Takahashi

(10) Patent No.: US 6,312,217 B1
(45) Date of Patent: Nov. 6, 2001

(54) VARIABLE CAPACITY SUPERCHARGER

(75) Inventor: Yukio Takahashi, Sodegaura (JP)

(73) Assignee: Ishikawajima-harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 09/524,382

(22) Filed: Mar. 13, 2000

(30) Foreign Application Priority Data

Mar. 11, 1999 (JP) .................................................. 11-065020

(51) Int. Cl.[7] .................................................. F01D 17/12
(52) U.S. Cl. ..................... 415/160; 415/201; 415/214.1; 415/196; 417/423.14
(58) Field of Search ..................... 415/160, 206, 415/201, 214.1, 196, 173.1; 417/423.14

(56) References Cited

FOREIGN PATENT DOCUMENTS 4-73597    6/1992  (JP) .
09-296731  11/1997 (JP) .

Primary Examiner—Christopher Verdier
Assistant Examiner—James M McAleenan
(74) Attorney, Agent, or Firm—Griffin & Szipl, P.C.

(57) ABSTRACT

A plurality of mounting holes 28 are bored in gas discharge channel 9a of turbine shroud 9 disposed on the inner periphery of turbine housing 1 on the opposite side to bearing housing. Screw holes 29 are constructed correspondingly to mounting holes 28, in annular holder 12a formed in cover 12 so that gas discharge channel 9a can be inserted. Screw holes 29 are slightly offset from mounting holes 28 in the gas discharging direction. Stopping screws 30 with taper pins 30a tapered at tips thereof are screwed into screw holes 29, thereby taper pins 30a are inserted into mounting holes 28. Thus, the effects of thermal deformation of the turbine housing are prevented from directly acting on the turbine shroud.

2 Claims, 4 Drawing Sheets

VARIABLE CAPACITY SUPERCHARGER

This application claims priority on Japanese Patent Application Number 65020/1999, filed Mar. 11, 1999, the entire disclosure of which is incorporated herein by reference.

BACKGROUND OF THE INVENTION

1. Technical Field of the Invention

The present invention relates to a variable capacity supercharger whose flow rate of gas introduced can be adjusted.

2. Prior Art

The variable capacity supercharger in which a plurality of nozzle vanes are assembled and the rate of flow of gas to be introduced into a turbine is adjusted by controlling the throat between the nozzle vanes, have been widely used. Such supercharger is described in, for example, unexamined Japanese patent publication No. 296731/1997 and unexamined Japanese utility model publication No. 73597/1992. One of these examples is shown in FIGS. 1A and 1B. In detail, turbine housing 1 and compressor housing 2 are integrated into one body via bearing housing 3. Turbine impeller 4 in turbine housing 1 and compressor impeller 5 in compressor housing 2 are connected with turbine shaft 7 supported freely rotatably by bearing 6 in bearing housing 3. Annular turbine shroud 9 with gas discharge channel 9a is formed on the inner periphery of the above-mentioned turbine housing 1 on the side opposite to bearing housing 3 using bolts 8. Annular channel 10 is constructed between axially opposed surfaces of the outer periphery of the turbine shroud 9 and the inner periphery of turbine housing 1 on the bearing housing 3 side. On the outer surface of above-mentioned turbine housing 1 on the side opposite to bearing housing 3, cover 12 with gas outlet 11 that communicates with gas discharge channel 9a of the turbine shroud 9 is installed using bolts 13. Gas introduced from gas inlet 14 is guided to turbine impeller 4 from scroll channel 15 provided in turbine housing 1 to turbine impeller 4 through above-mentioned annular channel 10, then the gas is discharged from gas outlet 11 via gas discharge channel 9a. In this configuration, a large number of nozzle vanes 16 are arranged circumferentially in annular gas channel 10 constructed from above-mentioned scroll channel is to the outer periphery of turbine impeller 4. One end of operating shaft 17 is fixed at the each nozzle vane 16 and the other end of the shaft penetrates the outer portion of turbine shroud 9. The shaft 17 is protruded into torque transmission chamber 18 constructed between turbine shroud 9 and cover 12, and is connected to an actuator via transmission mechanism 19 in a link mechanism.

The transmission mechanism 19 is constructed as follows. Each operating shaft 17 rotatably engages with the base end of link 20, and the link is provided with engagement slot 20a at the tip end. Rotation ring 21 is arranged circumferentially on the outer part of each operating shaft 17. The same number of connecting pieces 22 as the number of the links 20 are installed freely rotatably at the rotation ring 21 via shafts 23. Each connecting piece 22 is engaged freely rotatably with engagement slot 20a of the each link 20. Pin 24 is installed at a freely selected location in the circumferential direction of the rotation ring 21. An actuator (not illustrated) is connected to pin 24 through arm 25, shaft 26, and transmission lever 27. The actuator rotates rotation ring 21, and as the rotation ring 21 revolves, an opening or closing angle of each nozzle vane 16 can be changed by means of each link 20 and operating shaft 17. Thus, the opening or closing angle of each nozzle vane 16 is controlled, and a throat between each nozzle vane 16 is adjusted to widen or narrow, so that the flow rate of gas can be varied from large to small rates.

However, in the case of a variable capacity supercharger in the above-mentioned type, because turbine shroud 9 is fixed to turbine housing 1 using bolts 8, the effect of thermal deformation in turbine housing 1 directly affects turbine shroud 9, resulting sometimes in changes in concentricity and inclination of the shroud. In addition because cover 12 is installed on turbine housing 1 with bolts 13, when transmission mechanism 19 is assembled, mounting work must be done in a blind condition, so the work is difficult. Consequently, if cover 12 is removed, the interior is inspected, and the equipment is reassembled, the results of the first adjustment often deviate from intended values because of divided transmission mechanism 19, often causing the practical problem of positional offset.

SUMMARY OF THE INVENTION

Therefore the objects of the present invention include isolating the turbine shroud from direct transmission of thermal deformation of the turbine housing, easy and simple assembly of the transmission mechanism by mounting the cover on the turbine housing, and maintaining its initial condition after reassembly even if the cover is removed many times from the turbine housing.

The present invention provides a configuration to solve the aforementioned problems; annular turbine shroud (9) with gas discharge channel (9a) formed at its inner periphery is arranged on the inner periphery on the opposite side to bearing housing (3) of turbine housing (1); annular channel (10) is created between axially opposed surfaces of the outer periphery of the above-mentioned turbine shroud and the inner periphery of the turbine housing on the bearing housing side; a large number of nozzle vanes (16) are arranged, whose opening or closing angle can be adjusted by rotating operating shaft (17) that penetrates the outer periphery of the above-mentioned turbine shroud; transmission mechanism (19) is connected to the operating shaft, penetrates cover (12) installed on the outer surface of the turbine housing and is connected to an external actuator; with the variable capacity supercharger configured above, above-mentioned turbine shroud (9) is structured to insert in turbine housing (1) in the axial direction, gas discharge channel (9a) of the turbine shroud is constructed at the cover, and turbine (9) is integrated into cover (12).

According to the configuration of the present invention, the turbine shroud is integrated into the cover and isolated from the turbine housing, therefore, even when the turbine housing thermally deforms, it does not directly affect the turbine shroud. In addition, since the transmission mechanism can be maintained as originally assembled even after removing the cover, the initial assembly conditions can be retained even after reassembly.

Furthermore, a plurality of mounting holes (28) are constructed circumferentially at predetermined intervals in gas discharge channel (9a) of turbine shroud (9), screw holes (29) corresponding to the mounting holes (28) are arranged with a slight offset to the above-mentioned mounting holes in the gas discharging direction, in annular holder (12a) which is formed to screw in and retain the gas discharge channel (9a) on the inner surface of cover (12); and fixing screws (30) with taper pins (30a) tapered at tip portions are screwed in the above-mentioned screw holes, so that taper pins can be screwed into the mounting holes.

In this configuration according to the present invention, the turbine shroud can be strongly constricted in the axial direction, so that the spacing for coupling to the cover can be reduced.

Other objects and advantages of the present invention are revealed by the following description referring to the attached drawings.

DESCRIPTION OF PREFERRED EMBODIMENTS

Figure 1A:
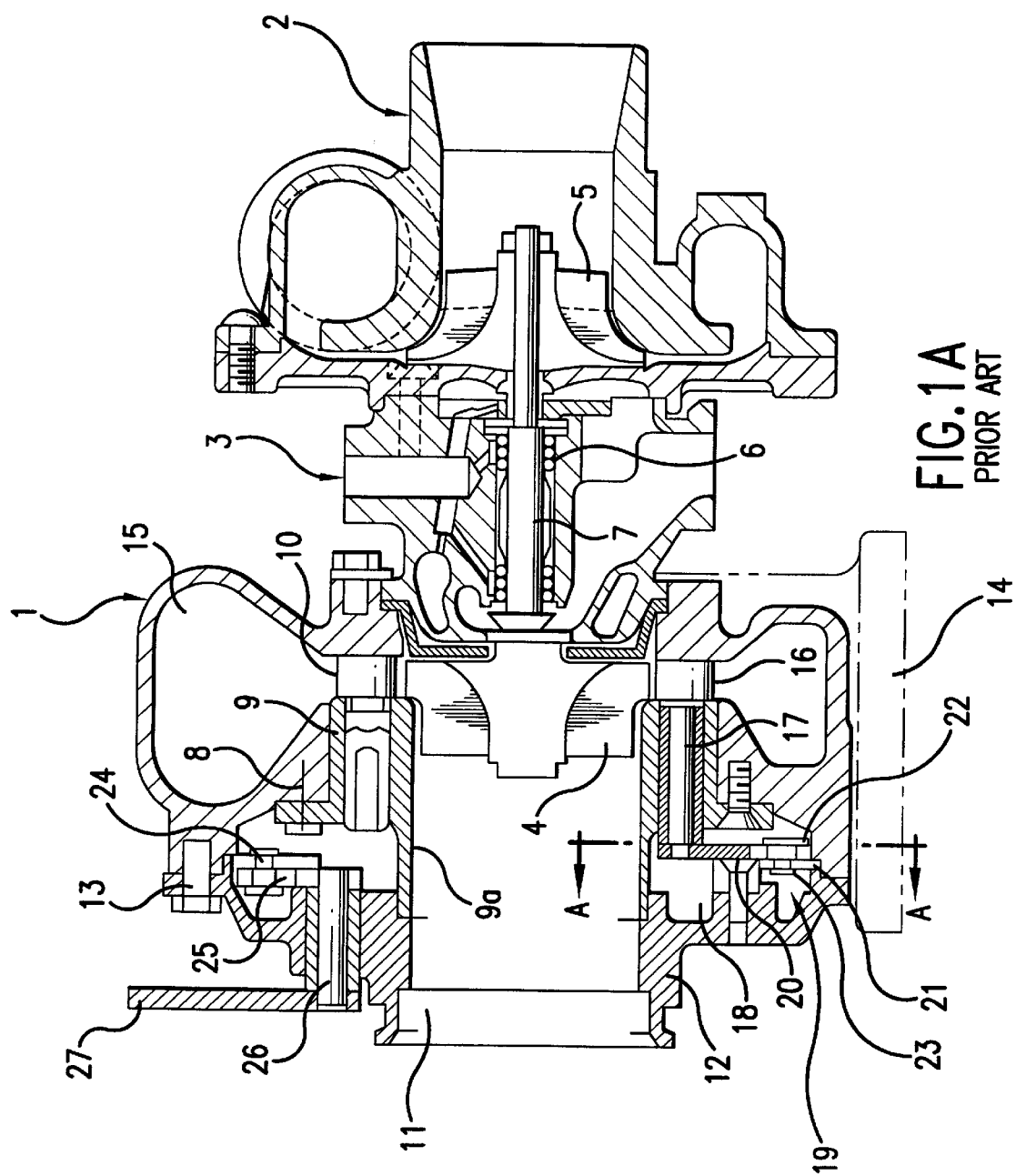
FIG. 1A is a general view of a conventional variable capacity supercharger.

Embodiments of the present invention are described below referring to the drawings.

Figure 1B:
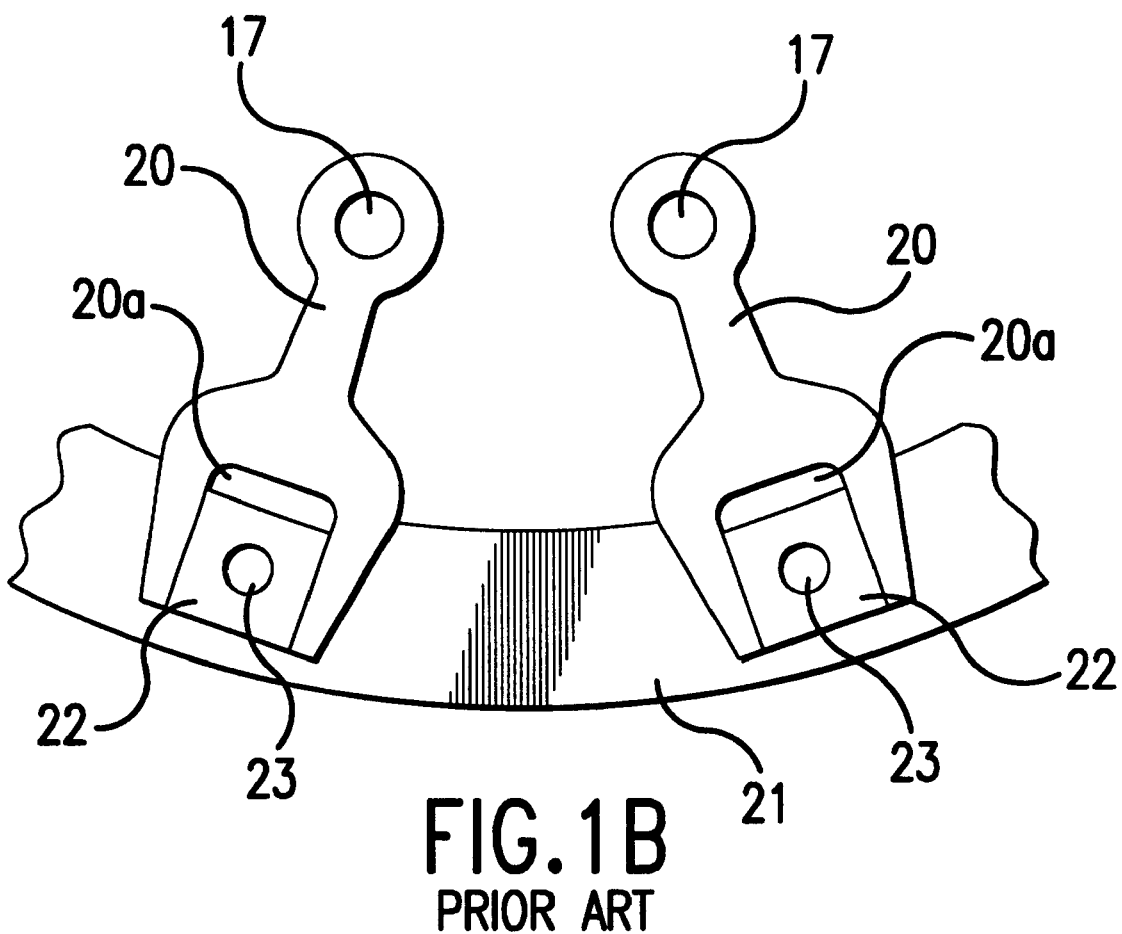
FIG. 1B is a view in the A—A direction in FIG. 1A.
Figure 2:
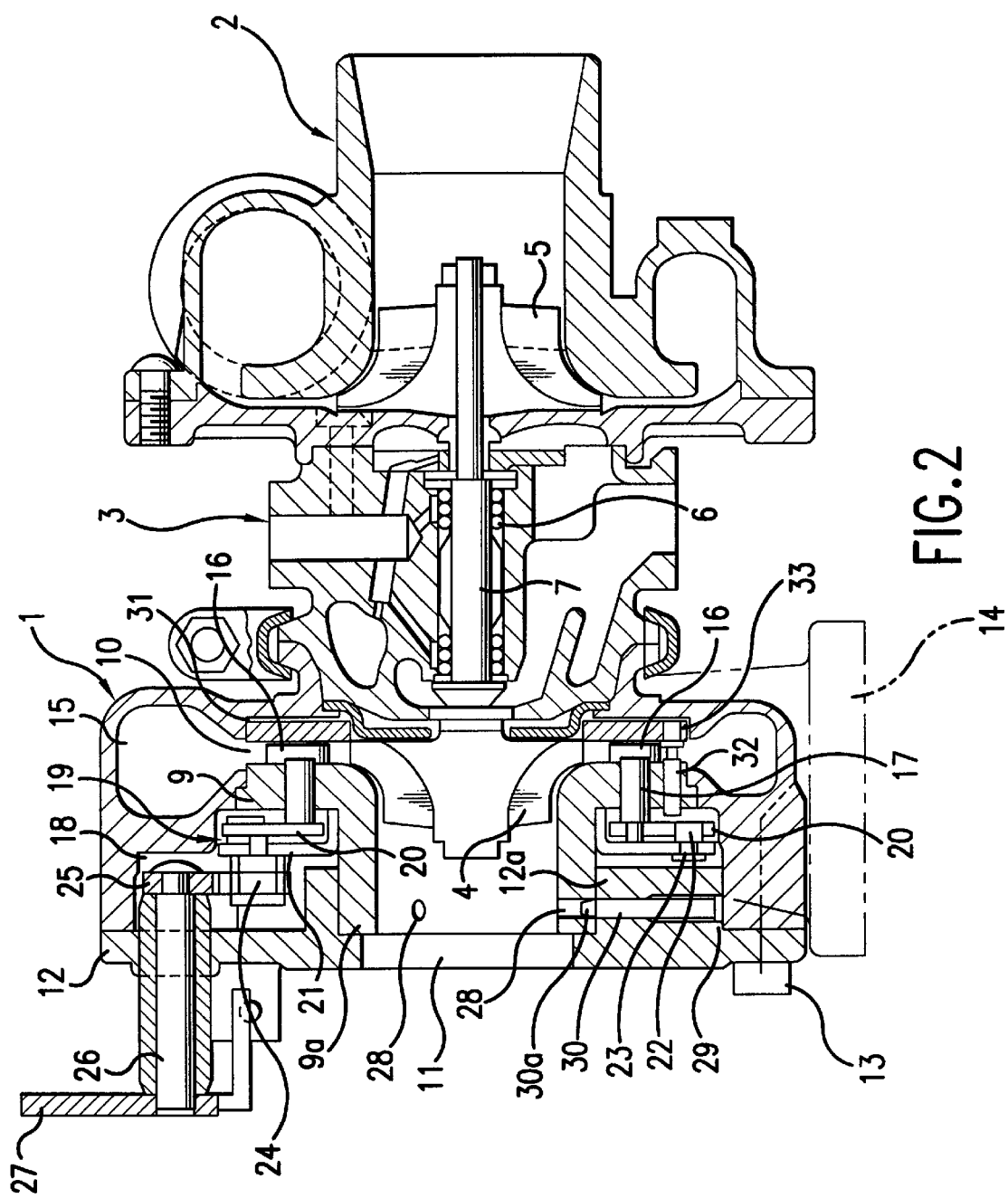
FIG. 2 shows a general view of an embodiment of the variable capacity supercharger according to the present invention.
Figure 3A:
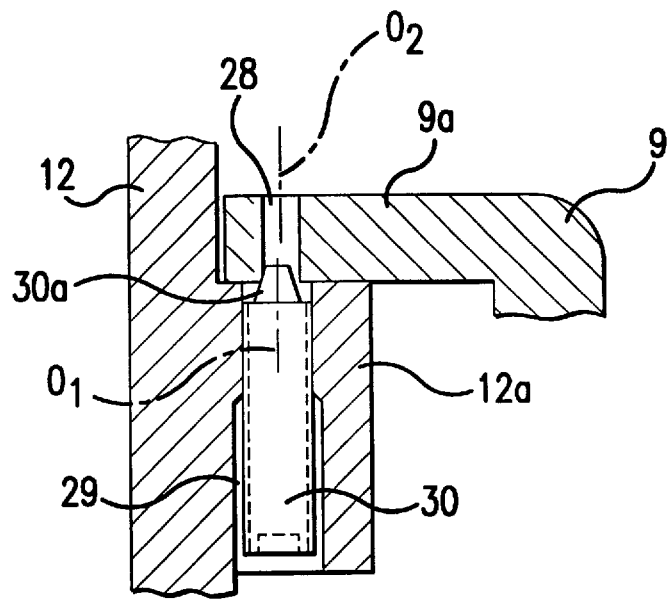
FIG. 3A is an enlarged view of a section of a fixing screw before it is tightened, related to a structure for mounting a turbine shroud to a cover.
Figure 3B:
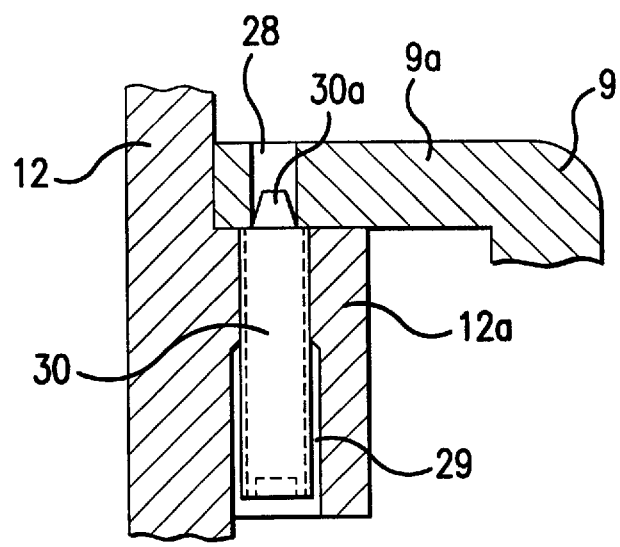
FIG. 3B is an enlarged view of the section after the fixing screw is tightened.

FIGS. 2, 3A, and 3B show an embodiment of the present invention. In the same way as shown in FIGS. 1A and 1B, annular turbine shroud 9 with gas discharge channel 9aformed on the inner periphery, is arranged on the inner periphery of turbine housing 1 of the opposite side to bearing housing 3. Annular channel 10 is created between axially opposed surfaces of the outer periphery of the turbine shroud 9 and the inner periphery of the turbine housing 1 on the bearing housing 3 side. In the annular channel 10, a large number of nozzle vanes 16 are disposed, and their opening or closing angle can be adjusted by rotating operating shaft 17 that penetrates the outer periphery of the turbine shroud 9. Transmission mechanism 19 is connected to above-mentioned operating shaft 17, penetrates through cover 12 mounted on the outer surface portion of turbine housing 1, and is connected to an external actuator. In the variable capacity supercharger constructed as described above, the turbine shroud 9 is structured to engage with turbine housing 1 in the axial direction. At least three mounting holes 28 are bored at predetermined intervals in the circumferential direction on gas discharge channel 9a of above-mentioned turbine shroud 9. In addition, annular holder 12a is formed on the inner surface portion of above-mentioned cover 12 so that the gas discharge channel 9a can be screwed in and retained. Screw holes 29 corresponding to above-mentioned mounting holes 28 are provided such that axial center $O_1$ of the screw hole 29 is slightly offset from axial center $O_2$ of mounting hole 28 in the gas discharging direction. Fixing screw 30 with taper pin 30a tapered at the tip portion is screwed in above-mentioned screw hole 29. Thus, taper pin 30a is screwed into mounting hole 28, thereby turbine shroud 9 and ancillary transmission mechanism 18, nozzle vanes 16, etc. are integrated to cover 12.

In addition, annular recess 31 is constructed on the annular channel formation portion of turbine housing 1, that forms annular channel 10. In this recess 31, clearance control plate 33 shaped like a ring is arranged. The clearance between clearance control plate 33 and nozzle vanes 16 is maintained by means of mounting shaft 32 installed on the outer periphery of turbine shroud 9, which determines the circumferential intervals and position of the clearance control plate 33.

The configurations of the other components are the same as those shown in FIGS. 1A and 1B, so the same portions are identified with the same numerals.

When the apparatus is assembled initially, gas discharge channel 9a of turbine shroud 9 is engaged with annular holder 12a of cover 12, and fixing screws 30 are coupled with screw holes 29 and tightened. Thus, turbine shroud 9 can be cantilever-fixed to cover 12 because taper pin 30a tapered at the tip of set screw 30 enters mounting hole 28. At that time, as shown in FIG. 3A, since axial center $O_1$ of screw hole 29 is slightly offset from axial center $O_2$ of mounting hole 28 in the gas discharging direction, when fixing screw 30 is inserted and screwed into screw hole 29, as shown in FIG. 3B, turbine shroud 9 is given with high constraining force in the axial direction by a taper axial of taper pin at the tip of fixing screw 30. Therefore, the connection gap to the inner side surface of cover 12 can be reduced, and at the same time, centering can be achieved.

In the above, because transmission mechanism 19, nozzle vanes 16, clearance control plate 33, etc. can be assembled and integrated with turbine shroud 9 through visual inspections, the turbine shroud can be handled as a unit consolidated with cover 12. Therefore, when cover 12 is removed from turbine housing 1 for an inspection etc., turbine shroud 9 and transmission mechanism 19 for nozzle vanes 16 can also be removed as a unit, and when they are reassembled later, the unit can be assembled simply by installing cover 12 onto turbine housing 1. In other words, turbine housing 9, transmission mechanism 19, etc. need not be disassembled, but as far as the assembly is adjusted and assembled only at the first time, no positional deviations occur in the assembly and initially assembled conditions can be maintained even after repeated reassembly, even if cover 12 is removed many times from turbine housing 1.

In the above, even if turbine housing 1 is thermally deformed, turbine shroud 9 is not affected directly by the thermal deformation, because turbine shroud 9 is integrated with cover 12 and isolated from turbine housing 1. Therefore, concentricity or leveling of the assembly can be maintained. In addition, because gas discharge channel 9a of turbine shroud 9 is constrained by taper pins 30a equipped at a minimum of three circumferential locations, centering through the assembly can be maintained even when there is a difference in thermal expansions.

According to the variable capacity supercharger of the present invention as described above, the annular turbine shroud with the gas discharge channel formed on its inner periphery is arranged on the inner periphery of the turbine housing on the side opposite to the bearing housing. The annular channel is constructed between axially opposed surfaces of the outer periphery of the turbine shroud and the inner periphery of the turbine housing on the side opposite to the bearing housing. In the above-mentioned annular channel, a large number of nozzle vanes are disposed and their opening or closing angle can be adjusted by rotating the operating shaft penetrating the outer periphery of the turbine shroud. The transmission mechanism is connected to the above-mentioned operating shaft, penetrates through the cover attached on the outer side surface of the turbine housing and is connected to an external actuator. In the thus configured variable capacity supercharger, the turbine shroud is structured to engage with the turbine housing in the axial direction. In addition, the gas discharge channel of the above-mentioned turbine shroud is installed on the cover, thereby the turbine shroud is integrated to the cover. Therefore, any thermal deformation of the turbine housing is not transmitted directly to the turbine shroud, therefore, concentration-changing or leveling-changing probabilities can be reduced. Moreover, because assembly of the transmission mechanism etc. can be checked visually, the efficiency of assembly work can be increased. In addition, because the turbine shroud, transmission mechanism, etc. can be consolidated onto the cover as an integrated unit, component parts are not displaced even if the cover is removed many times. Consequently, initial assembly conditions can be maintained even after the components are reassembled. Furthermore, a plurality of mounting holes are bored in the gas discharge channel of the turbine shroud, circumferentially at predetermined intervals. The annular holder is formed on the inner side surface of the cover so as to engage with and hold the gas discharge channel, and the screw holes corresponding to the above-mentioned mounting holes are constructed on the annular holder with a slight offset from the mounting holes in the gas discharging direction. The fixing screws with taper pins tapered at the tips are engaged into the above-mentioned screw holes, and the taper pins are screwed into the mounting holes. In the configuration described above, the taper pins can strongly constrain the turbine shroud in the axial direction, so that the connection gap to the cover can be reduced, and the construction can be free from backlash. These effects are preferred and advantageous.

However, the present invention is not limited only to the above-mentioned embodiments, and the transmission mechanism 18 can also be structured in a different way, therefore, various modifications can be incorporated provided they conform to the scope of the claims of the present invention.

What is claimed is:

1. In the variable capacity supercharger comprising a turbine housing (1), a bearing housing (3), an annular turbine shroud (9) with a gas discharge channel (9*a*) formed on the inner periphery thereof, arranged on the inner periphery of the turbine housing on the opposite side to the bearing housing, an annular channel (10) formed between axially opposed surfaces of the outer periphery of the turbine shroud and the inner periphery of the turbine housing on the bearing housing side, a large number of nozzle vanes (16) arranged in the annular channel in such a manner that the opening or closing angle of the nozzle vanes are adjusted by rotating an operating shaft (17) that penetrates the center periphery of the turbine shroud, a transmission mechanism 19 connected to the operating shaft, penetrating a cover (12) mounted to the outer side surface of the turbine housing, and connected to an external actuator, a variable capacity supercharger in which the turbine shroud (9) is structured to insert in the turbine housing (1) in the axial direction, and the gas discharge channel (9*a*) of the turbine shroud is mounted on the cover, thus the turbine shroud (9) is integrated into the cover (12).

2. The variable capacity supercharger specified in claim 1, in which a plurality of mounting holes are bored at predetermined intervals in the circumferential direction in the gas discharge channel (9*a*) of the turbine shroud (9); screw holes corresponding to the mounting holes (28) are bored in an annular holder (12*a*) formed for fitting and holding the gas discharge channel (9*a*), with a slight offset between centers of the mounting hole and the screw hole in the gas discharging direction; and stopping screws (30) with taper pins (30*a*) tapered at tips thereof are screwed into the screw holes and the taper pins are inserted into the mounting holes.

* * * * *